United States Patent Office 3,459,983
Patented Aug. 5, 1969

3,459,983
COMMUTATOR SEGMENTS FOR DYNAMOELECTRIC MACHINES AND COIL END CONNECTORS
Roy Price Bowcott, Solihull, England, assignor to Joseph Lucas (Industries), Limited, Birmingham, England, a British company
Filed Feb. 17, 1966, Ser. No. 528,305
Claims priority, application Great Britain, Feb. 18, 1965, 6,995/65
Int. Cl. H02k *13/04, 13/00*
U.S. Cl. 310—234     3 Claims

ABSTRACT OF THE DISCLOSURE

In a commutator segment for a dynamoelectric machine of the kind in which a pair of parts are provided one being a mirror image of the other, with the parts interconnected in facial contact to define a surface over which the brushes move, the parts having a pair of arms upstanding therefrom as is usual. However, instead of receiving the windings directly, these parts receive an additional part in which the windings are received, giving an overall saving in material.

---

This invention relates to commutator segments for dynamoelectric machines, of the kind comprising a pair of parts one of which is a mirror image of the other, said parts being interconnected in facial contact to define a surface over which the brushes of the machine move, and a pair of arms upstanding from said surface and adapted to support the ends of armature windings on the rotor of the machine.

In one known construction, the arms themselves are shaped to receive the windings, but such a construction has the disadvantage that there is a relatively large wastage of material when the parts are formed. According to the present invention, in a segment of the kind specified the arms are relatively short, and the segment includes a third part which engages with the arms, and is retained thereby, the third part being adapted to receive the armature windings.

The term "relatively short" refers to the lengths of the arms as compared with the known construction described above.

The invention further resides in a method of manufacturing a segment of the form specified above.

Figure 1:
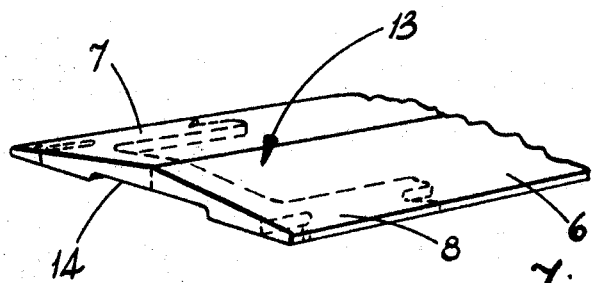
Figure 2:
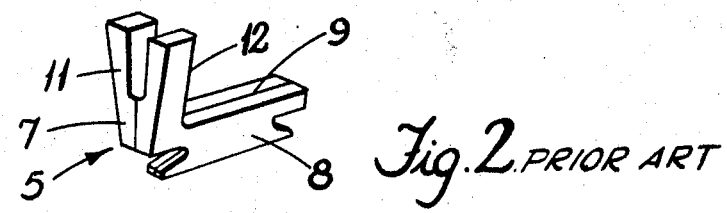
Figure 3:
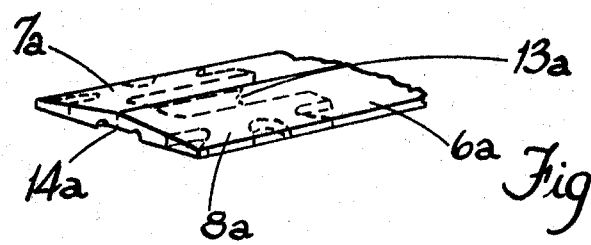
Figure 4:
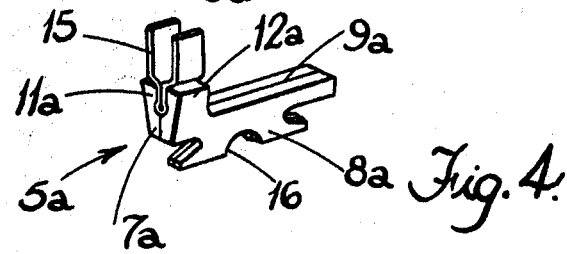

In the accompanying drawings, FIGURES 1 and 2 illustrate the manufacture of a known commutator segment, and FIGURES 3 and 4 are views similar to FIGURES 1 and 2 respectively illustrating one example of the invention.

Referring first to FIGURES 1 and 2, the commutator segment 5 shown in FIGURE 2 is made by stamping from a strip 6 of suitable cross-section a pair of parts 7, 8 indicated in dotted lines in FIGURE 1. The parts 7, 8 are then interconnected in facial contact to define a surface 9 over which the brushes of the machine move, and a pair of arms 11, 12 upstanding from one end of the surface 9 and adapted to support the ends of armature windings on the rotor of the machine.

It will be seen that in FIGURE 1 a portion 13 of the strip 6 is wasted at each stamping operation. In FIGURE 3 and 4, wherein parts equivalent to those in FIGURES 1 and 2 are indicated by the same reference numerals with the suffix *a*, the arms 11*a*, 12*a* are relatively short, and so the wasted portion 31*a* is very much smaller. Instead of the recess 14 in the strip 6, the strip 6*a* has a recess 14*a* shaped to provide arcuate portions which, when the parts 7*a*, 8*a* are interconnected, define a groove for receiving a separate part 15 for supporting the armature coil ends. Preferably, but not essentially, recesses 16 are formed in the parts 7*a*, 8*a* to reduce the weight of the segment.

The part 15 can take a variety of forms and could, for example, be a closed loop, or an open loop with the ends of the loop trapped in the groove.

A plurality of segments of the form illustrated are located in facial contact but separated by insulating material to form the commutator, which includes commutator cones holding the segments together. The finished commutator is dip soldered to hold the parts together, the surface 9*a* being machined so that it is accurately cylindrical.

Having thus described my invention what I claim as new and desire to secure by Letters Patent is:

1. A commutator segment for a dynamoelectric machine comprising a pair of parts in contacting juxtaposition, each a mirror image of the other, said parts having substantially flat upper surfaces over which brushes move, a pair of spaced arms upstanding from said surfaces, and a third part between and engaged with said arms adapted to receive armature coil ends.

2. A commutator segment as claimed in claim 1, wherein said pair of upstanding arms define a cavity therebetween, the side walls of said cavity having concave recesses for mechanically retaining said third part.

3. A commutator segment as claimed in claim 2, wherein said pair of parts are stamped from the same strip and then severed from each other; and the relative dimensions and placement of said pair of parts on said strip is such that wastage is minimized.

References Cited

UNITED STATES PATENTS

| | | | |
|---|---|---|---|
| 1,707,596 | 4/1929 | Bertram | 310—236 |
| 2,297,464 | 9/1942 | Fleischmann | 310—236 |
| 2,845,556 | 7/1958 | Sunkler et al. | 310—234 |
| 3,161,947 | 12/1964 | Schafer et al. | 29—597 |
| 1,898,696 | 2/1933 | Sorensen | 29—597 |

WARREN E. RAY, Primary Examiner

U.S. Cl. X.R.

29—597; 310—236